(12) United States Patent
Lambert

(10) Patent No.: US 10,024,990 B2
(45) Date of Patent: Jul. 17, 2018

(54) TOWED SEISMIC NODE

(71) Applicant: ION Geophysical Corporation, Houston, TX (US)

(72) Inventor: Dale J. Lambert, Mandeville, LA (US)

(73) Assignee: ION GEOPHYSICAL CORPORATION, Houston, TX (US)

(*) Notice: Subject to any disclaimer, the term of this patent is extended or adjusted under 35 U.S.C. 154(b) by 97 days.

(21) Appl. No.: 15/204,714

(22) Filed: Jul. 7, 2016

(65) Prior Publication Data

US 2017/0010372 A1    Jan. 12, 2017

Related U.S. Application Data

(60) Provisional application No. 62/189,647, filed on Jul. 7, 2015.

(51) Int. Cl.
| G01V 1/38 | (2006.01) |
| G01V 1/16 | (2006.01) |
| G01V 1/18 | (2006.01) |
| G01V 1/20 | (2006.01) |

(52) U.S. Cl.
CPC ............ *G01V 1/186* (2013.01); *G01V 1/168* (2013.01); *G01V 1/202* (2013.01); *G01V 1/3843* (2013.01)

(58) Field of Classification Search
CPC ........ G01V 1/168; G01V 1/186; G01V 1/202; G01V 1/3843
USPC .......................................................... 367/16
See application file for complete search history.

(56) References Cited

U.S. PATENT DOCUMENTS

| 4,912,817 | A  | 4/1990  | Sandreid |
| 6,024,344 | A  | 2/2000  | Buckley et al. |
| 7,286,442 | B2 | 10/2007 | Ray et al. |
| 7,310,287 | B2 | 12/2007 | Ray et al. |
| 7,602,667 | B2 | 10/2009 | Thompson |
| 7,649,803 | B2 | 1/2010  | Ray et al. |
| 7,804,737 | B2 | 9/2010  | Thompson |
| 7,724,607 | B2 | 10/2010 | Ray et al. |
| 7,883,292 | B2 | 2/2011  | Thompson et al. |
| 7,933,165 | B2 | 4/2011  | Thompson et al. |
| 7,990,803 | B2 | 8/2011  | Ray et al. |
| 8,050,140 | B2 | 11/2011 | Ray et al. |
| 8,087,848 | B2 | 1/2012  | Thompson et al. |
| 8,172,480 | B2 | 5/2012  | Thompson et al. |
| 8,226,328 | B2 | 7/2012  | Thompson et al. |
| 8,228,761 | B2 | 7/2012  | Ray et al. |
| 8,328,467 | B2 | 12/2012 | Thompson et al. |
| 8,496,407 | B2 | 7/2013  | Thompson et al. |
| 8,801,328 | B2 | 8/2014  | Thomspon et al. |
| 8,864,416 | B2 | 10/2014 | Thompson et al. |
| 8,879,362 | B2 | 11/2014 | Ray et al. |
| 8,966,718 | B2 | 3/2015  | Woodard et al. |
| 9,003,612 | B2 | 4/2015  | Woodard et al. |

(Continued)

OTHER PUBLICATIONS

The International Search Report and Written Opinion dated Oct. 10, 2016 in connection with International Patent Application No. PCT/US2016/041248, 19 pages.

*Primary Examiner* — Daniel L Murphy
(74) *Attorney, Agent, or Firm* — Dorsey & Whitney LLP

(57) ABSTRACT

A marine seismic sensor system includes a seismic node having at least one seismic sensor. The sensor is configured for sampling seismic energy when towed through a water column on a rope. The coupling can be adapted to modulate transmission of acceleration from the rope to the seismic node.

21 Claims, 8 Drawing Sheets

(56) References Cited

U.S. PATENT DOCUMENTS

| | | | |
|---|---|---|---|
| 9,256,002 B2 | 2/2016 | Woodard et al. | |
| 9,405,030 B2 | 8/2016 | Thompson et al. | |
| 9,429,671 B2 | 8/2016 | Rokkan et al. | |
| 9,448,311 B2 | 9/2016 | Maxwell | |
| 2005/0276161 A1 | 12/2005 | Olivier | |
| 2006/0176774 A1 | 8/2006 | Toennessen | |
| 2009/0324338 A1 | 12/2009 | Thopmson et al. | |
| 2013/0003498 A1 | 1/2013 | L'Her et al. | |
| 2013/0163374 A1 | 6/2013 | Herrmann | |
| 2014/0104982 A1 | 4/2014 | Berg et al. | |
| 2016/0041280 A1 | 2/2016 | Naes et al. | |
| 2016/0041284 A1 | 2/2016 | Rokkan et al. | |
| 2016/0041285 A1 | 2/2016 | Rokkan et al. | |
| 2017/0075013 A1* | 3/2017 | McMillian | B63B 21/60 |

* cited by examiner

TOWED SEISMIC NODE

CROSS-REFERENCE TO RELATED APPLICATION(S)

This application claims priority to U.S. Provisional Application No. 62/189,647, filed Jul. 7, 2015, entitled TOWED SEISMIC NODE, which is incorporated by reference herein, in the entirety and for all purposes.

BACKGROUND

This application relates generally to seismic prospecting, and in particular to sensor arrangements for gathering seismic data. Suitable applications include, but are not limited to, seismic nodes for use in marine seismic surveys.

In towed marine seismic exploration, a hydrophone array is typically towed behind a marine vessel near the sea surface. The hydrophones are mounted to multiple sensor cables, commonly referred to as streamers. The streamers serve as platforms or carriers for the hydrophones, which are distributed along the length of each streamer in the array.

A set of seismic sources, also towed near the sea surface, are operated to periodically emit acoustic energy. The acoustic energy of interest propagates downward through the seawater (or other water column), penetrates the ocean floor, reflects from the subsea strata and other underlying structures, and returns upward through the water column to the hydrophone array.

The reflected seismic energy (or acoustic wave energy) arrives at receiver points in the towed hydrophone array. The array includes many such receiver points, distributed along each of the streamer cables, with sensors configured to generate data records characterizing the upward-traveling acoustic wavelets (or seismic waves) received from the subsurface structures beneath the seabed, at each of the receiver points. The hydrophone data recordings are later processed to generate seismic images of the underlying structures.

Noise is a major consideration in towed streamer operations. Noise sources encompass both coherent and random (or incoherent) effects, including, but not limited to, marine life, source bubble events, vessel noise, swell noise, and wave noise arising from the sea surface. Towing the streamers also generates noise due to flow effects as the streamers travel through the water column, and due to the seismic system sensitivity to acceleration.

Some of these noise components propagate through the streamers (or streamer cables), and some propagates through the water column itself. The presence of such noise contributions can adversely affect the accuracy of the sub-surface images, which are obtained from the processed seismic data. As a result, there is an ongoing need for more advanced marine seismic survey techniques, with reduced noise and improved seismic image quality.

SUMMARY

A nodal seismic system is described, where one or more autonomous seismic nodes are towed using one or more simple ropes, cables or similar strength members. Each node can be configured with lateral position control capability, depth control capability, or both. An adjustable tether system may be provided for tethering the nodes to the ropes or cables.

Depending upon application, each node may determine its own absolute position in the water column, or its relative position with respect to the tow rope or cable. Each node may thus control its own respective (absolute or relative) position in the array, while under tow.

Individual seismic nodes, modular seismic arrays and nodal seismic systems can be configured according to the examples and embodiments disclosed herein. Methods of deploying and operating the seismic nodes, arrays and systems are also encompassed.

In one particular embodiment, a marine seismic sensor system includes a seismic node having at least one seismic sensor disposed in a hydrodynamic body. The hydrodynamic body is adapted to modulate drag and flow noise, and the sensor is configured for sampling seismic energy when towed through a water column. A tether couples the hydrodynamic body to a rope, e.g., which subjects the seismic node to a tow force.

At least one active or passive control surface can be provided on the hydrodynamic body, and configured for positioning the seismic node with respect to the water column when tethered to the rope. The tether can include one or more elastic members adapted to modulate the transmission of one or more frequency components of the acceleration of the rope, e.g. in order to reduce the relative acceleration of the seismic node. As a result, noise can be reduced and improved seismic images can be generated.

DETAILED DESCRIPTION

Figure 1A:
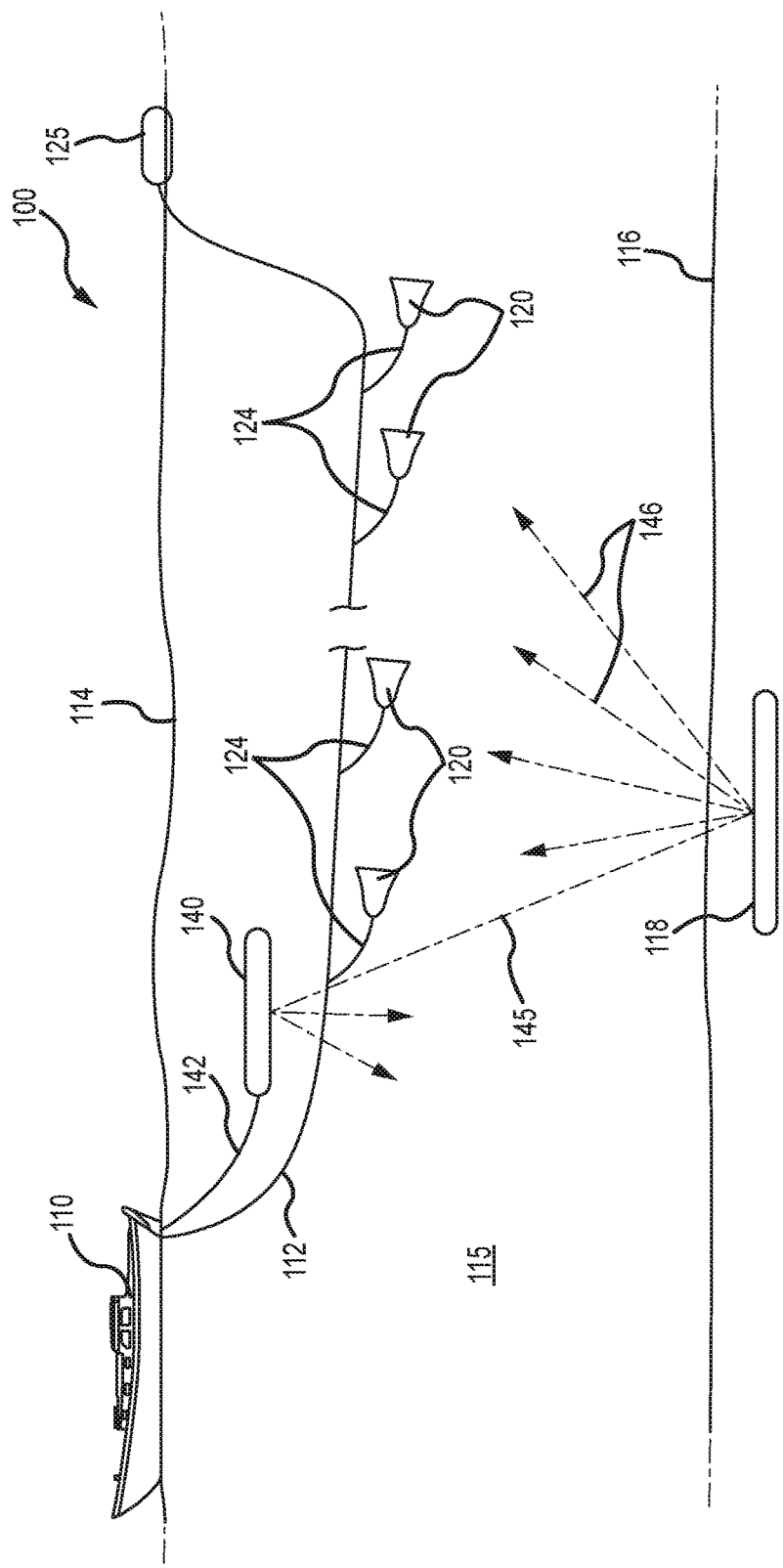
FIG. 1A is a profile view illustrating an exemplary seismic survey, as described herein.

In the following, reference is made to embodiments of the invention. It should be understood, however, that the invention is not limited to the specifically described embodiments. Any combination of the following features and elements, as described in terms of the various embodiments, is contemplated to implement and practice the invention. As described in these various embodiments, the features of the invention provide advantages over the prior art. Although the embodiments of the invention may achieve such advantages over the prior art, and over other possible solutions, whether or not a particular advantage is achieved by a given embodiment does not limit the invention. The following aspects, features, embodiments and advantages are merely illustrative, and are not considered elements or limitations of the appended claims, except where explicitly recited. Likewise, reference to "the invention" shall not be construed as a generalization of any inventive subject matter disclosed herein, and shall not be considered to limit the claims except where expressly included.

Streamer systems such as described by Tenghamn et al. in U.S. Pat. No. 7,239,577, which is incorporated by reference herein, may employ a plurality of hydrophones or geophones disposed along the streamer cables and configured to separate surface reflections from the desired seismic energy of interest, coming from the subsurface strata or other target structures. Such measurements may be imperfect, however, particularly at low frequency due to noise contributions from towing energy being captured in the hydrophones or geophones, or other seismic sensors.

Streamer Noise and Drag Effects

The tension, which varies along the streamer length, also affects the streamer response to particle motion. For example, sound energy which should slightly displace the streamer (e.g., vertically) must overcome in-line tension in the cable. Given that the tension varies along the streamer, being the greatest near the tow vessel and smallest at the tail, sensor response is not uniform down the length of the streamer cable. Also, as the length increases and other drag effects occur, such as barnacles growing on the streamers, the tension increases further, with a commensurately greater impact on the sensor response.

Noise contributions propagating down the streamer can be characterized using geophone arrays to measure sound energy propagating in line with the streamer central axis. This can also lead to non-uniform array response, depending on the energy arrival angle with respect to the in-line direction. It would thus be advantageous to provide a more uniform sensor response over the entire streamer length, both over time and with respect to the arrival angle, as described herein.

Streamer systems typically pass data and telemetry along communication paths defined down the streamer length. The streamer electronics are typically powered from shipboard power systems on board the tow vessel, and the current must flow long distances to the in-streamer electronics, which may be many miles from the ship. This leads to power inefficiencies, and any breakage in the long electrical circuits used for power or data telemetry can cause data loss or result in a survey work stoppage. Single point failures in the communication and power system also limit scalability, including limits on how many sensors can be used in a given survey.

Where power and telemetry are passed down the streamer cable, the conductor weight must also be offset by positive ballast. Flow noise at the streamer skin can be attenuated by putting the hydrophone at the streamer's center (or along the longitudinal axis), providing a radial distance or spacing between the sensor and the outer radius of the streamer to buffer the sensor from noise effects. These factors can require a relatively larger streamer diameter, e.g. roughly 49 mm (about two inches) or more, which means the streamer has substantial surface area in contact with the water. This increased surface area is a significant cause of drag, which the towing vessel must overcome at the cost of reduced towing speed, higher fuel consumption, or both.

Some of these noise issues are addressed by ocean bottom nodal systems such as described by Lambert et al. in U.S. patent application Ser. No. 14/710,373, filed May 12, 2015, and U.S. Publication No. 2015/0331126, entitled OCEAN BOTTOM SYSTEM, each of which is incorporated by reference herein, in the entirety and for all purposes. Such systems are deployed on the ocean floor, and can acquire seismic measurements while static.

Ocean bottom nodes can be deployed by remote underwater vehicle operations using a remotely operated vessel (ROV) or unmanned, autonomous underwater vessel (AUV), or deployed from a surface vessel on a rope or cable system. The production rate and data collection timescale may be slower and more costly than for towed streamer systems, because the ocean-bottom receivers must be retrieved and redeployed in order to take additional data in a different location.

Accordingly, an improved seismic node system for recording seismic data is provided, where the sensor system captures seismic data of interest but substantially rejects noise, with improved seismic data productivity even relative to modern, state-of the art streamer applications. In addition, the system provides higher data quality than is available with current ocean bottom or towed streamer systems, and reduces fuel costs by lowering overall drag.

Figures

Figure 1B:
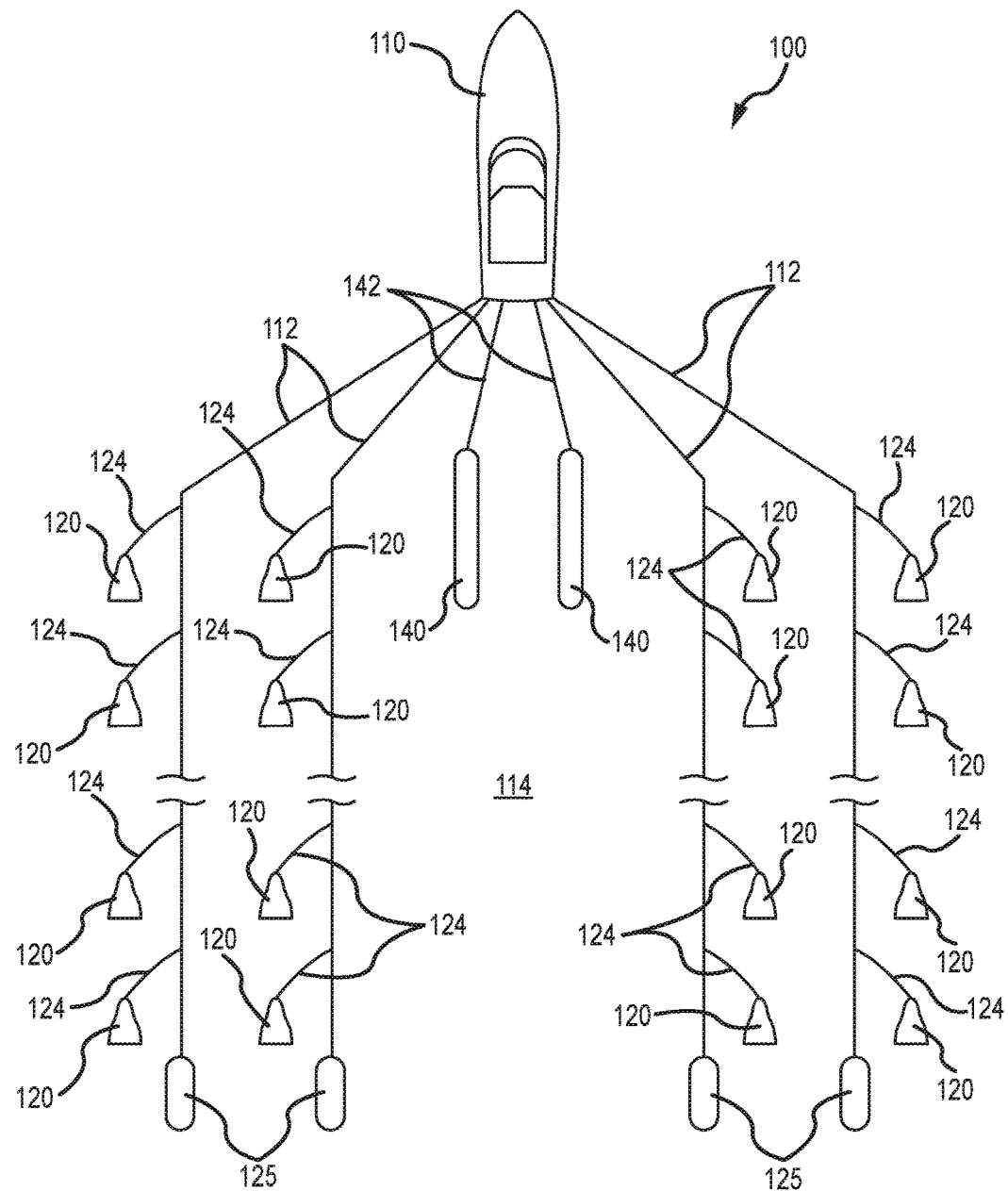
FIG. 1B is a plan view of the seismic survey.

FIG. 1A illustrates an exemplary seismic survey 100 according to the present disclosure, in profile view. FIG. 1B is a plan view of seismic survey 100, as shown in FIG. 1A. System, device, method and apparatus embodiments are also encompassed, including both specialized seismic sensor hardware and computer software and firmware components adapted to operate the hardware to obtain higher quality seismic imaging data, with reduced noise contributions.

As shown in FIGS. 1A and 1B, a seismic vessel 110 tows one or more ropes or cables 112 at or near the surface 114 of water column 115, for example an ocean, sea, lake, river, reservoir, or other body of water. Attached to the ropes 112 are autonomous recording nodes (seismic nodes) or other devices 120, which are being towed through the water column 115 by the seismic vessel 110. In this particular example, vessel 110 also tows a seismic source 140, for example an airgun array coupled to an umbilical cable 142.

Acoustic energy 145 (dashed lines) emitted by the sources 140 travels down through the water column 115 to the sea bed or other bottom surface 116. A portion of the energy reflects from the bottom, and a portion travels through the bottom 116 to the underlying subsurface structures 118. The subsurface structures 118 also reflect energy, which propagates back up toward the surface 114 of water column 115. Reflections can also occur at the surface 114, generating a combination of upgoing and downgoing seismic wavefields.

The reflected seismic energy (or wavefield) 146 can be captured and sampled by the seismic sensors or receivers distributed in seismic nodes 120 of seismic survey 100. The wavefield energy can be acquired as seismic data using hydrophones, geophones, accelerometers, and/or gradient pressure measurement components in each node 120, or other instruments sensitive to acoustic (sound) waves and associated seismic energy passing through water column 115.

The seismic nodes 120 can be internally powered, each with its own individual timing reference or clock and memory for storing seismic data. The data are acquired by one or more seismic receivers or sensors, such as hydrophones, geophones, or a combination thereof. Individual nodes 120 can be directly attached to the rope 112, for example with a clamping mechanism or other attachment member, or nodes 120 can be attached via a tether 124 coupled to the node or receiver 120 at one end and to the adjacent portion of rope 112 the other (opposite) end.

A tail float or buoy 125 may be provided at the end of rope 112, as shown in FIGS. 1A and 1B, or this position may be occupied by a seismic node or other device 120, in either a tether or untethered (directly attached) configuration. One or more floats or buoys 125 can also be provided at the head of rope 112, or at intermediate positions along rope 112.

Tethers 124 are configured to provide a degree of mechanical isolation between the rope 112 and nodes 120, and to reduce the coupling tension. In particular, the tension is typically substantially less in each individual tether 124, which is coupled between rope 112 and one or more individual nodes 120, than in the adjacent rope 112, which is coupled to many nodes 120 that can be distributed over hundreds or thousands of meters of cable length. Tethers 124 can also incorporate elastic members in order to absorb vibrations and oscillations in rope 112, reducing relative acceleration and corresponding noise effects in the seismic nodes 120.

Individual nodes 120 may be provided with navigational instrumentation to determine absolute position in the water column 115, or to determine relative position with respect to the tow rope 112, vessel 110, or other navigational reference. Individual nodes 120 can also be provided with fins, foils, wings, planes or other control surfaces configured to allow the nodes 120 to control or maintain respective lateral positions relative to the true course of vessel 110, or with respect to rope 112 and/or the position of vessel 110 on the surface 114 of water column 115. The control surfaces can be passive or fixed in orientation with respect to the node body, or actively actuated to change their orientation in order to maintain or adjust the node position with respect to the tow rope 112 and/or the surface 114 of the water column 115.

Nodes 120 can also include depth measurement and depth control components, e.g., similar to those provided with the Model 5011 COMPASS BIRD or ACOUSTIC BIRD systems, available from ION Geophysical of Harahan, La. Additional navigational components include, but are not limited to, compasses, acoustic receivers, acoustic transceivers, gyroscopic instruments, inertial navigation devices, and other instrumentation suitable to determine, maintain and adjust the location of each respective node 120.

Navigational, control, and seismic data acquisition functionality can also be partitioned among different nodes or devices 120, depending on application. For example, navigational (steering), control (processor) and seismic sensor elements can be combined in a single device 120, or provided in separate, distinct devices 120, either attached in different positions along the same rope or cable 112, or deployed along different ropes or cables 112.

Communication of navigational data including position and control signals is performed between the navigational components in the steering nodes or steering devices 120 (e.g., with lateral steering and/or depth adjustment capability), and the control components in the control nodes or control devices 120 (e.g., with computer-based position determination components). The control and steering nodes 120 may or may not include seismic sensors 320, and they may be provided as distinct devices 120 disposed in different locations along the rope 112, or the control, steering and sensing functions can be combined into a multi-purpose seismic node 120. Navigational data and control communications can be provided via any combination of acoustic transducers, electromagnetic signal interfaces, capacitive or inductive devices, and other wired or wireless network components.

Depending on embodiment, navigation and control functions can also be employed as described by Lambert et al. in U.S. Pat. No. 7,190,634, entitled GPS-BASED UNDERWATER CABLE POSITIONING SYSTEM, which is incorporated by reference herein, in the entirety and for all purposes. Steerable buoys can also be located throughout the survey spread, using acoustic measurements and/or other positional signals to determine range to one or more reference buoys, or other suitable position references. Automatic navigational controls can be implemented in each node 120, or dedicated controlling devices can be provided to hold a relative position for each respective node 120 with respect to the reference. The tow ship or other seismic vessel 110 can also be provided with a navigational system, e.g., as configured to control the position of the reference relative to the geophysical prospect or survey target, allowing seismic survey 100 to maintain each of the nodes 120 in a desired location.

Deployment and Recovery

Figure 2:
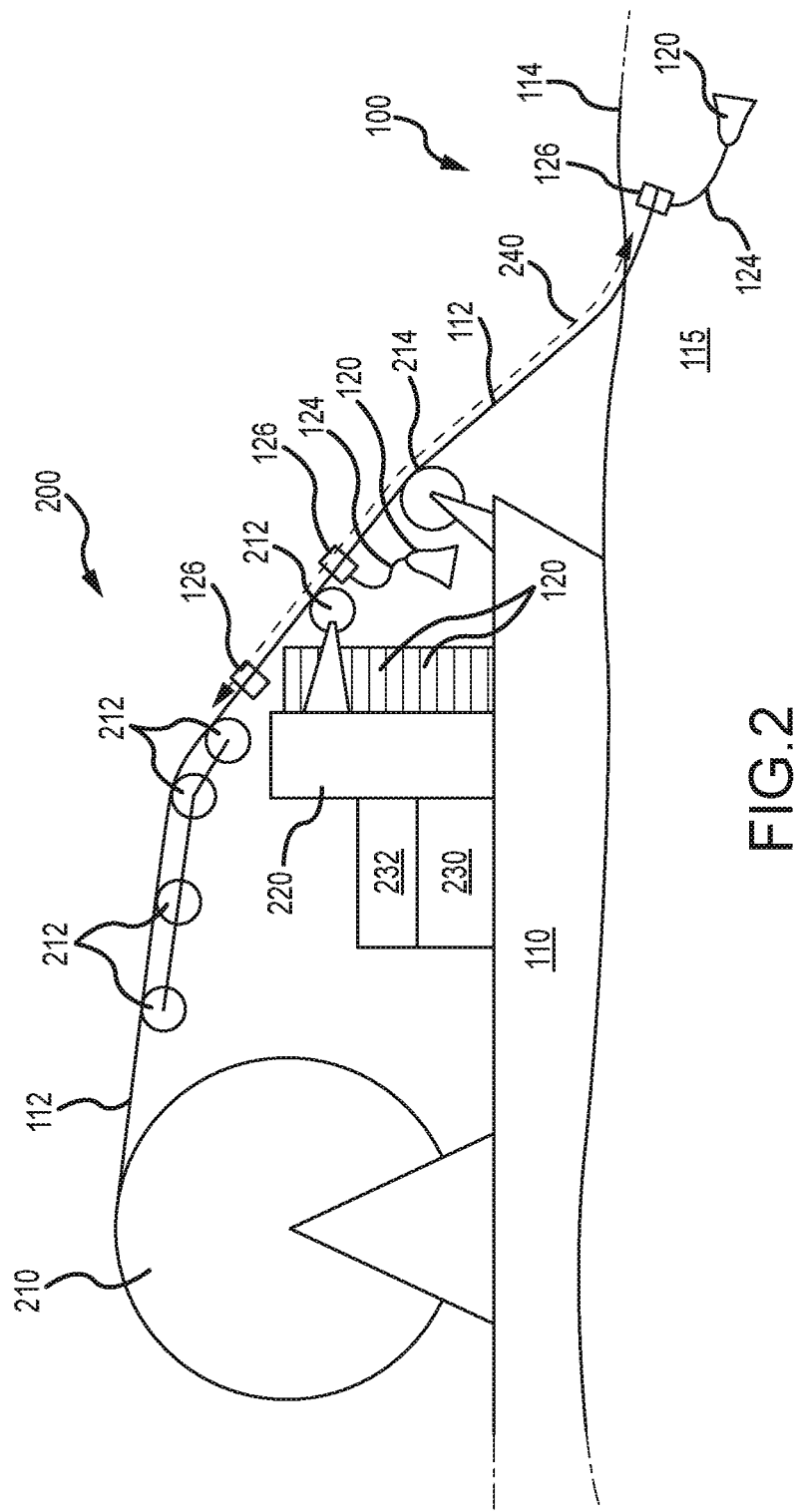
FIG. 2 is a schematic illustration showing a representative deployment system suitable for deploying a marine seismic array.

FIG. 2 shows a representative deployment system 200, configured for deployment and retrieval of a seismic survey 100. In one particular embodiment, a simple rope or cable 112 is deployed from a winch 210 through a series of pulleys 212 that place the rope 112 in proximity to a magazine or similar supply 220 of seismic nodes or devices 120. Devices 120 are attached to the rope 112 and deployed into water column 115 via one or more sheave devices 214.

System 200 can be deployed on the tow vessel or other seismic vessel 110, as shown in FIG. 2. A computer control system 230 can be used to configure desired deployment arrangements for nodes 120 on rope 112, for use in a particular seismic array or survey 100.

A database 232 of desired deployed arrangements can be used for manual or robotic (automated) connection of the nodes or other devices 120 to each rope 112. For example, individual nodes 120 can be coupled to selected positions along rope 112 using a clamping mechanism or similar mechanical attachment 126. In this example, attachment 126 couples one end of tether 124 to a desired position along rope 112, so that nodes 120 are deployed in selected positions in seismic survey 100. Different sets of preselected positions are also possible, as determined by control system 230 and the corresponding survey configurations stored in database 232.

Prior to deployment, the internal clocks or other timing references in each node 120 are typically synchronized relative to a master clock. After deployment, the nodes 120 can be recovered by brings rope 112 back on board vessel 110 via winch 210, and automatically or manually detaching the nodes 120 from rope 112 for storage, battery charging and data recovery.

One exemplary embodiment includes a communication system or network 240 (dashed double arrow) that runs down and along the length of the rope 112, in order to facilitate timing and provide a level of on-line quality control via communication of navigational information between vessel 110 and the individual nodes or other devices 120 distributed along each rope 112.

For example, communication system 240 can be configured for exchanging positional data and control (steering and navigation) signals between computer control system 230 on vessel 110 and nodes 120 distributed in seismic survey 100, and between the individual nodes or other devices 120 distributed along each rope 112. Note that loss of communication via system 240 does necessarily hamper production of seismic data by survey 100, and system 240 may be used for passive tracking and well as active positioning of individual nodes 120.

Both wired and wireless communication networks are encompassed for communication system 240, using one or more electromagnetic, acoustic, radio, optical, capacitive and inductive signal components. In one particular application, a passive frequency shift keying (FSK) communication system utilizing inductive coils is employed, for example as provided in the Model 5011 COMPASS BIRD or ACOUS- TIC BIRD systems manufactured by ION Geophysical of Harahan, La. Another possibility is a single wire communication system 240, for example using inductive coil components with a seawater return loop.

Several different sources of noise can obscure the signals received in typical streamer systems, but these contributions can be addressed to mitigate noise effects and improve overall seismic image quality, as described herein. Flow noise contributions are also considered, including noise contributions due to pressure variations caused by water flowing around ropes 112 and the bodies of individual seismic nodes 120, when towed through the water column 115.

Figure 3A:
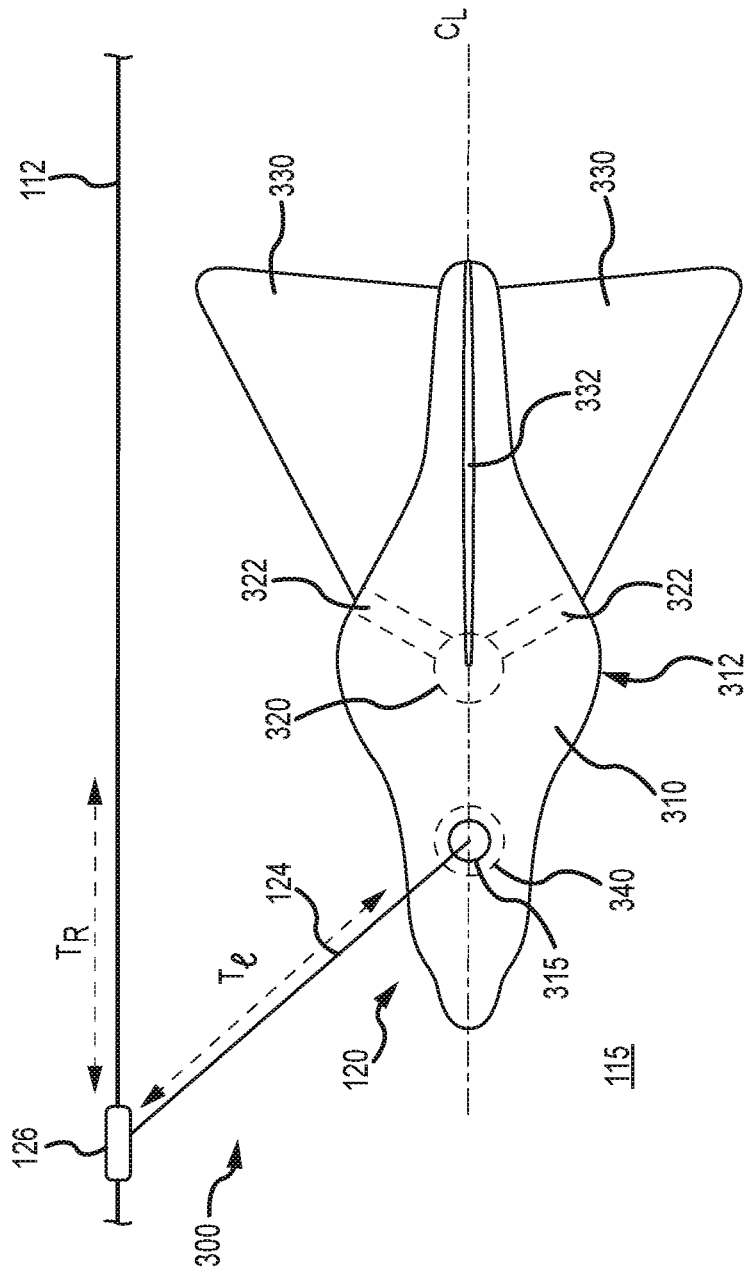
FIG. 3A is profile view showing an exemplary or sample node design, suitable for use in the marine seismic array or survey.
Figure 3B:
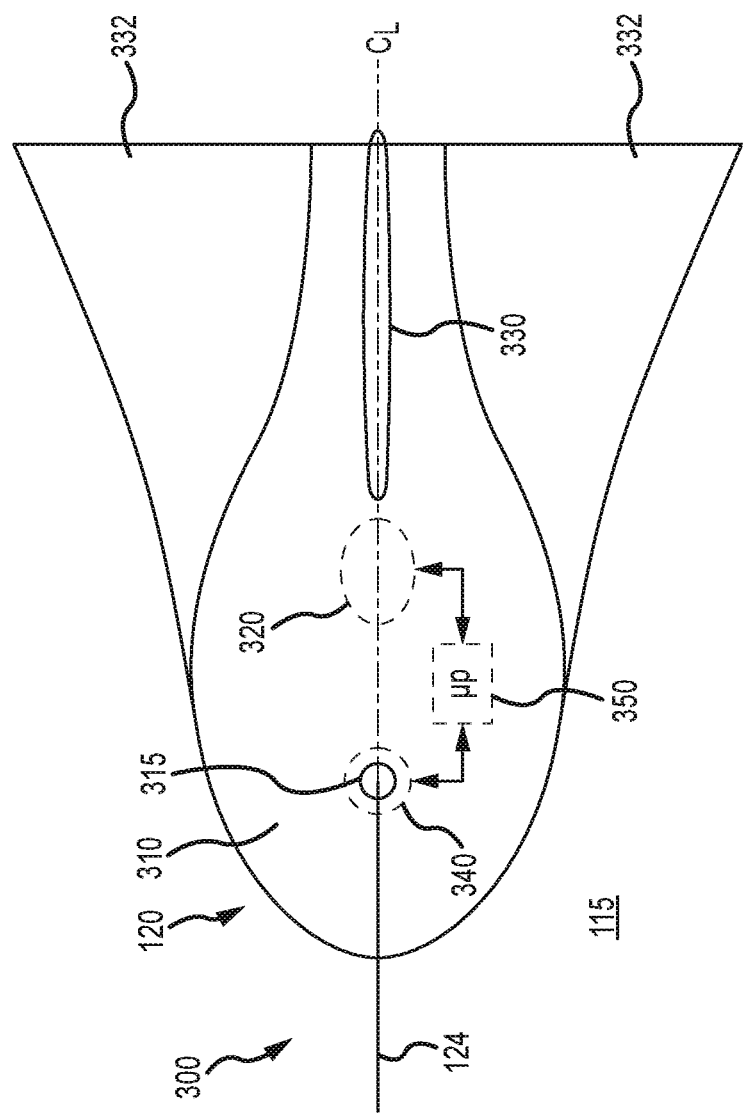
FIG. 3B is a top view of the sample node design.

FIG. 3A is profile view showing an exemplary design for a seismic node 120, suitable for use in a marine seismic array or survey system 100, as described herein. FIG. 3B is a top view of the representative node design 120. Node and tether system 300 includes the node 120 and tether 124, which is coupled to the node body or housing 310 at attachment 315, and to an adjacent section of rope 112 via a clamp or other mechanical attachment 126.

In the examples of FIGS. 3A and 3B, the seismic node or device 120 is designed with a smooth, hydrodynamically shaped body or housing 310 adapted to modulate drag and flow noise by reducing or minimizing turbulent flow when travelling through water column 115, and to lessen the corresponding drag and noise contributions caused by turbulent flow. Modulating the drag and flow noise coefficients includes reducing the drag noise to improve fuel consumption and imaging at a given towing velocity, and shifting noise frequencies out of the range of interest so that corresponding noise contributions are reduced during image processing.

The hydrophone or other seismic sensor 320 can also be placed along the centerline $C_L$ of node body 310, near the geometric or hydrodynamic center of device 120, in order to space sensor 320 at an increased or maximized distance from the outer surface 312 of the body or housing 310. One or more sound conduits or acoustically conductive paths 322 can be provided, extending from sensor 320 through body 310 of device 120 to water column 115 on the outer surface 312 of the device housing.

Hydrophone flow noise reduction and minimization techniques with multiple hydrophones or similar sensors 320 can also be utilized, for example as described by Fay in U.S. Pat. No. 4,388,711, entitled OPTIMUM FLOW NOISE CANCELLING HYDROPHONE MODULE, which is incorporated by reference herein. Towing noise can be addressed using acceleration cancelling hydrophone sensors 320, such as the TELEDYNE T2BX sensor manufactured by Teledyne Geophysical of Houston, Tex. Towing noise can also be reduced using accelerometer type sensors 320, for example as described by Lambert et al. in U.S. patent application Ser. No. 14/275,497, filed May 12, 2014, and U.S. Publication No. 2014/0328138, entitled SEISMIC SYSTEM WITH GHOST AND MOTION REJECTION, each of which is incorporated by reference herein, in its entirety and for all purposes.

In addition, towing noise can be reduced by connecting the device 120 to the rope 112 via a relatively short tether or tether system 124. In these embodiments, the tension T in the tether connection member 124 between the rope 112 and device 120 is substantially dependent on only the drag of the node 120 and tether 124 system 300 traveling through water column 115, and according to the corresponding tow velocity. This contrasts with the typically much higher tension $T_R$ in the main rope 112, which increases according to rope length and diameter, and varies across each coupling or attachment 126 to the nodes 120 via tethers 124.

The seismic node or device 120 can also be formed with near neutral or substantially buoyancy, with respect to the surrounding water column 115. In these embodiments, the device 120 has a more uniform response to particle motion in water column 115, as compared to a streamer system where the tension is substantially greater and the buoyancy is not necessarily neutral. One or more foils or fins 330, wings 332, stabilizers, planes and other control surfaces can also be provided on device body 310, in order to generate lift forces to control the depth and lateral position of each device 120 with respect to rope 112.

The tether system 124 can be formed of elastic material or include elastic members to dampen and filter or control the frequency and magnitude of acceleration energy transmitted from rope 112 to seismic node or device 120. Wave energy is imparted onto rope 112 by the tow vessel, and other components of the survey which are mechanically coupled to the towing ropes (or tow ropes) 112. As a result, rope 112 imparts acceleration and vibrational energy onto devices 120, with a number of different frequency components. The tethers 124 can be adapted to dampen that energy, and reduce the corresponding acceleration and displacement of device 120 with respect to the adjacent section of rope 112, to which device 120 is coupled by tether 124.

The resonant frequencies of the node and tether system 300 can be associated with the length of the tether section or member 124. Elastic tether sections (or members) 124 can be modeled as tensioned continuous beams, which are governed by the following partial differential equation:

$$EI\frac{\partial^4 y}{\partial x^4} - T\frac{\partial^2 y}{\partial x^2} + \rho A \frac{\partial^2 y}{\partial t^2} = p(x,t). \quad [1]$$

In this equation, E is the Young's Modulus of the tether section 124, I is the moment of inertia, y(x,t) is the transverse displacement along longitudinal coordinate x as a function of time t, and T is the tension, as defined along the corresponding tether member 124. The product $\rho A$ is the beam-equivalent mass per unit length of the tether member 124 (density $\rho$ times area A), and p(x,t) is the external force per unit length l (e.g., due to the drag on the tether section 124 and body 310 of the seismic node or device 120, while travelling through water column 115 at a particular towing speed). When this equation is solved for the natural frequencies of oscillation $\omega_n$, the results depend on the length l of the tether member 124 according to the following equation:

$$\omega_n^2 = \left(\frac{n\pi}{l}\right)^2 \frac{T}{\rho A} + \left(\frac{n\pi}{l}\right)^4 \frac{EI}{\rho A}. \quad [2]$$

In this equation, $\omega_n$ is the angular frequency of the $n^{th}$ natural mode of oscillation, and l is the tether length. Additional corrections may be made for viscous drag of the seismic medium (e.g., the water column), and other effects as known in the art. Care can be also taken in design to keep the fundamental frequency $\omega_1$ and harmonics $\omega_2$, $\omega_3$, etc. out of the measurement bandwidth of interest, for the acoustic sensors or other seismic sensor components 320. The natural frequencies transmitted along the tether can also be shifted out of the range of interest by adjusting the tether length based on the drag experienced at a given tow velocity, as described herein.

In some of these examples, a variable length mechanism for tether 124 can be employed to detect and automatically tune the natural frequencies $\omega_n$ of the tether system 300. For example, the tether length l can be varied by a small motorized winch or other mechanical actuator 340 provided in the node body 310, e.g., with actuator 340 coupled to tether 124 at one or more bridle-type attachments 315 on either side of node body 310, as shown in FIG. 3A, or via single (top) tether attachment 315, as shown in FIG. 3B.

Signals generated by accelerometers and other acoustic or seismic sensors 320 in node body 310 can be sampled and analyzed by a microprocessor ($\mu$P) control system 350, in order to detect undesired excitation modes or observed frequencies $\omega$ of oscillation. Based on the corresponding signal amplitudes, control processor 350 can be configured to control the winch 340 (or similar mechanism) to adjust the length l of tether 24 to shift the natural frequencies $\omega_n$ away from the observed frequencies $\omega$, in order to reduce or minimize resonance and propagation of the corresponding oscillation amplitudes and accelerations, due to towing effects.

Device controller (or electronics) 350 can incorporate an internal (local or slave) clock and memory components for time stamping and storing the seismic data obtained by sensor 320, along with navigational components configured to determine depth, position and speed. Devices 120 can also be provided with an internal power supply and a communication interface adapted for acoustic, electromagnetic, capacitive or inductive communication of the navigational data and control signals, as described above.

Care should be taken to keep the tether 124 from impacting the device 120 or node body 310 and causing additional unwanted noise. This problem can be addressed in several ways, for example using a bridle connection with a two-sided tether attachment 315, as shown in FIG. 3A, or with a single attachment 315 on the top of the device 120, as shown in FIG. 3B. Asymmetric and axial tether attachments can also be used, e.g., as shown in FIGS. 4 and 5.

Figure 4:
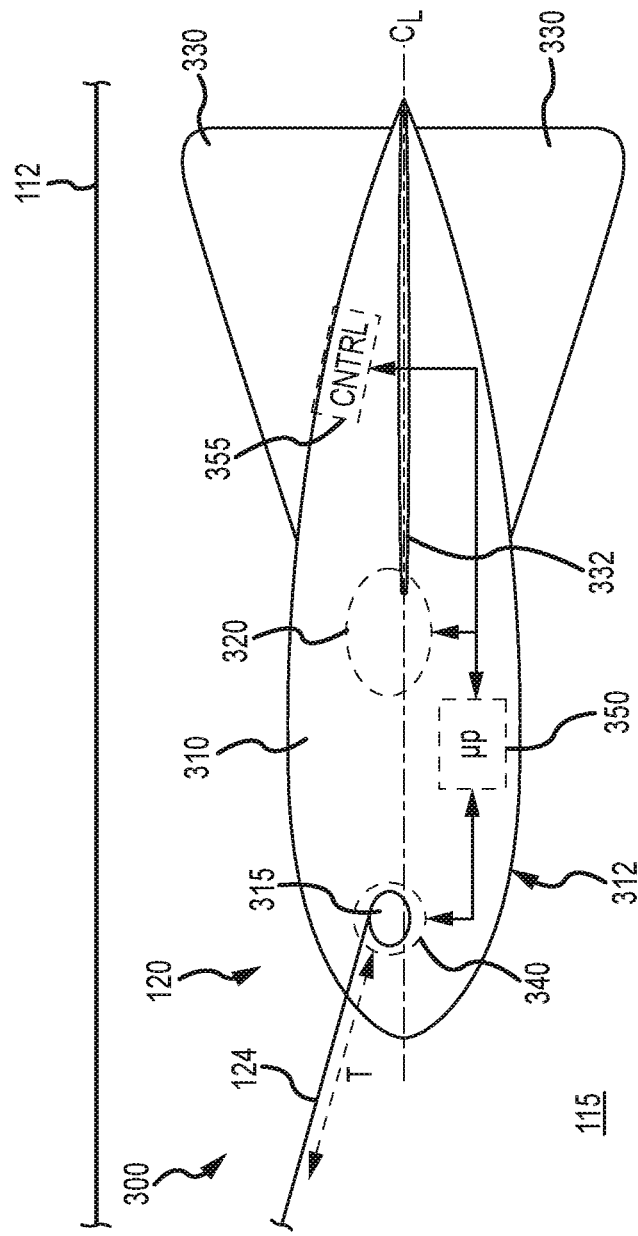
FIG. 4 is a profile view showing an asymmetric tether configuration, suitable for use with different node designs.
Figure 5:
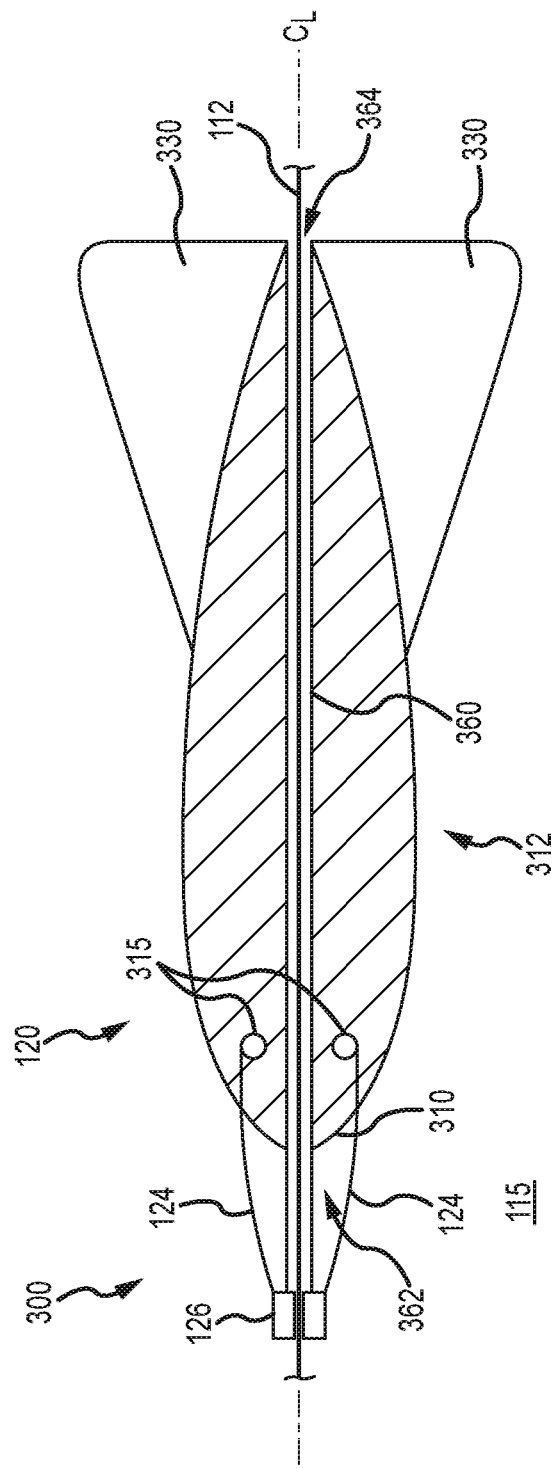
FIG. 5 is a section view showing a seismic node with a tow rope passing through an axial channel.

FIG. 4 is a profile view of a representative seismic node or device 120, showing tether 124 in an asymmetric configuration suitable for use with an exemplary hydrodynamic for node body design 310. In this configuration, tether 124 is coupled to an attachment 315 provided on one side of node body 310.

The tether attachment and tow force provided via tension T in tether 124 can be asymmetric or off-axis and off-plane (skew) with respect to centerline $C_L$ of node body 310, as shown in FIG. 4. Control surfaces such as foils or fins 330 and wings 332 can be provided on node body 310 to provide lift and lateral steering forces configured to control the position of node body 310 with respect to the rope 112. The lift (negative or positive) and steering (lateral) forces can be sufficient to keep the foils or control surfaces 330, 332 and other portions of node body 310 away from the tow rope 112, so that rope 112 and device 120 are mechanically isolated except for the connection provided along the flexible tether member 124.

Designing the tow rope 112 and node devices 120 with different buoyancy can also maintain the spacing of devices 120 apart from rope 112, or assist in doing so. In this example, the device 120 and rope 112 can have different individual buoyancies, but the combined buoyancy of the device 120, tether 124 and rope 112 may remain near neutral, with respect to water column 115.

FIG. 5 is a section view showing a seismic node or device 120 with tow rope 112 passing through the node body 310, e.g., substantially along the central axis $C_L$. The device 120 can be provided with a hydrodynamic body 310 shaped for the tow rope 112 to pass through central axis $C_L$, without touching against passage 360 on the interior of node body 310, or without substantial mechanical contact between the tow rope 112 and node body except at tether 124, as shown in FIG. 5.

A system of two or more tether sections or members 124 with multiple attachments 315 can be configured to impart a net towing force on device 120 which is substantially symmetric with respect to node centerline $C_L$, with respect to the tow rope 112, and/or with respect to the tow passage 360. In each of these embodiments, device 120 can be substantially mechanically isolated from rope 112 except for the flexible tow rope connection or tether 124, as described above.

In the particular example of FIG. 5, multiple tether sections 126 hold the tow rope 112 and node body 310 apart at the forward entrance or opening 362 of the interior passage 360, toward the front end of device 120 (left side in FIG. 5), and extending down passage 360 along central axis $C_L$ to the aft exit or opening 364 of passage 360 at the back end of node body 310 (right side in FIG. 5). Alternatively, incidental contact may be allowed between rope 112 and the interior surface of internal passage 360 inside node body 310, while providing substantially all of the towing force via the coupling of tether members 124 to attachments 315.

Acoustic Mobility

Acoustic mobility is defined herein as the ability of an object to faithfully follow the particle motion of a medium in which it is included. This property can be governed by several physical parameters, including, but not limited to, object density and size. For example, an object whose density matches that of the ambient medium, and which is small relative to the wavelength of the particle motion within the medium, will move in the medium with phase and amplitude substantially matching that of the particle motion in the medium. Such a device or object is described to have good acoustic mobility.

Increased density will typically reduce or degrade the object's acoustic mobility, while substantially decreased density can result in object motions with increased amplitude relative to that of the particle motion in the medium. An object with a relevant dimension that is large compared to the acoustic wavelength will also have reduced acoustic mobility.

As the energies of interest to marine seismic surveys typically propagate up through the water column 115 near vertical, one can design the device 120 to have good acoustic mobility by giving node body 310 a low in-water weight (substantially neutral buoyancy) and a large surface area in the horizontal plane, in order to capture displacements corresponding to vertically propagating acoustic or seismic energy. Thus, the foils, fins, wings and other control surfaces 300 can also contribute to the acoustic mobility, by increasing the surface area of the device in a particular plane. Depending on application, acoustic energy in the horizontal plane may however be generally considered nuisance noise. The device 120 may thus also be designed with a relatively lower surface area in the vertical plane, as compared to the relatively higher surface area in the horizontal plane, in order to reduce towing drag and suppress the horizontal noise response, as compared to the vertical seismic signal contributions.

Thus, the hydrodynamic body 310 can be adapted to preferentially or selectively capture acoustic or seismic energy propagating in the vertical direction (e.g., perpendicular or transverse to the water surface), with respect to acoustic or seismic energy propagating in the horizontal direction (e.g., parallel to or generally along the surface), increasing the signal to noise ratio. Conversely, the hydrodynamic body 310 can be adapted to preferentially reduce capture of acoustic or seismic energy propagating in the horizontal direction (acquiring relatively less noise) with respect to the vertical (acquiring relatively more signal). This can be accomplished by providing the body 310 of device 120 with different horizontal and vertical profiles, or by adjusting the relative sizes of the vertical surfaces (or fins) 330 and the horizontal surfaces (or wings) 332, in order to provide device 120 with relatively greater horizontal cross section or surface area and relatively less vertical cross section or surface area.

Where particle velocity sensing is employed, the device 120 (or on-board controller 350; see FIG. 3B) should have access to sensor components 320 configured to provide information characterizing the orientation of node body 310 with respect the water surface. Based on the orientation (and other navigational data), the control processor can be configured to maintain or adjust the depth, lateral position and orientation of node body 310 with respect to tow rope 112 and water column 115. Adjustments to the position and orientation can be made by controlling one or more fins, wings, foils or other surfaces 330 and 332 via the corresponding control surface actuator mechanisms (fin/wing controllers) 355, and also by adjusting the length of one or more tether members 124 via the tether actuator mechanisms 340.

If the accelerometers or other seismic sensors 320 do not provide sufficient information to determine the orientation of node body 310 independently, separate orientation sensors can be included with the processor/control system 350. Alternatively, a mechanical apparatus such as a gimbal or pivoted support system can be configured to maintain the sensors 320 in a known orientation with respect to the water column 115. Seismic nodes or devices 120 can also be ballasted in order to maintain proper orientation, e.g., as described by Olivier in U.S. Pat. No. 7,092,315, entitled DEVICE FOR LATERALLY STEERING STREAMER CABLES, which is incorporated by reference herein, in its entirety and for all purposes. These passive orientation techniques allow for proper orientation with minimal power use.

Figure 6:
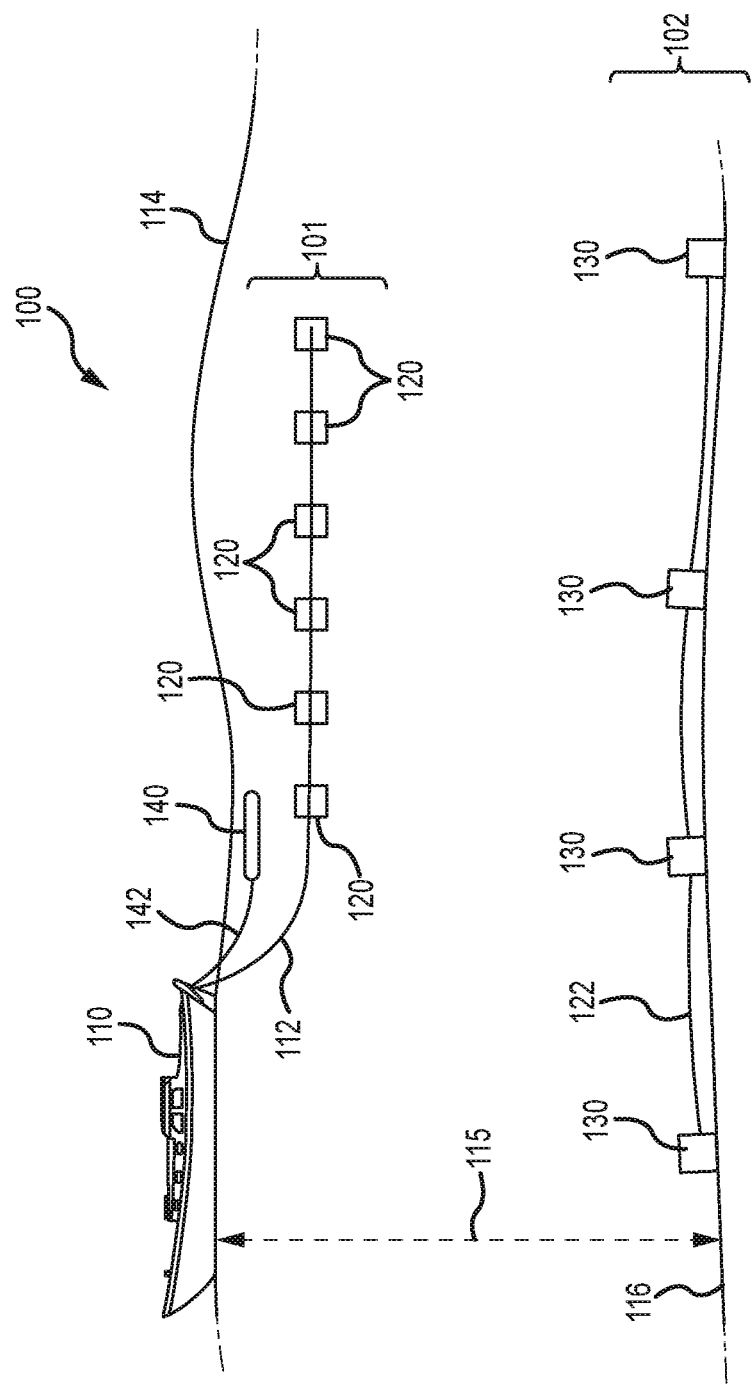
FIG. 6 is a profile view illustrating a representative marine seismic survey including both towed seismic nodes and ocean bottom nodes.

FIG. 6 is a profile view illustrating an exemplary marine seismic array or survey system 100, including both towed seismic nodes 120 and ocean bottom nodes 130. Towed nodes 120 are deployed along rope 112, and towed through water column 115 by vessel 110. Ocean bottom nodes 130 are deployed on the seafloor or bottom surface 118 of water column 115, e.g., an array of autonomous nodes, or along one or more ocean-bottom seismic cables 122.

In one particular embodiment, a seismic survey 100 may be conducted with a plurality of autonomous towed seismic sensor nodes 120 and ocean bottom nodes 130. The first portion or set 101 of the seismic nodes 120 can be towed by a vessel 110 at a selected depth in the water column 115, as described herein. A second portion or set 102 of the seismic nodes 130 may be deployed to the ocean bottom 118 for collecting additional seismic data. The second set or array 102 of ocean bottom seismic nodes 130 can be deployed via a rope, Remotely Operated Vehicle (ROV), Autonomous Underwater Vehicle (AUV), or using an autonomous on-board navigational system.

In one particular embodiment, the first set 101 of nodes 120 may be deployed as a towed array by a vessel 110 that also includes a seismic source 140 coupled to an umbilical cable 142. In other embodiments, the towed set or array 101 of nodes 120 may be towed by a vessel 110 other than the source vessel.

FIG. 6 illustrates an exemplary seismic survey 100 comprising both towed nodes 120 as well as ocean bottom nodes 130, in combination with a seismic source 140. As shown in FIG. 6, the seismic source 140 may be deployed above (at a lesser depth than) the towed array 101, with towed nodes 120 distributed along rope 112 below the depth of source 140 in water column 115. Alternatively, the seismic source 140 can be deployed at the same depth as or deeper than (below) the towed array 101, with towed nodes 120 distributed along rope 112 at or above the depth of source 140 in water column 115.

In some embodiments, the first set or array 101 of nodes 120 may be towed in a predefined acquisition pattern, for example, a zig-zag pattern or other arrangement as described by Brooks et al. in U.S. patent application Ser. No. 14/711,154, filed May 13, 2015, and U.S. Publication No. 2015/0331127, entitled METHODS AND SYSTEMS FOR CONDUCTING RECONNAISSANCE MARINE SEISMIC SURVEYS, each of which is incorporated by reference herein, in the entirety and for all purposes. One advantage of a seismic survey 100 that includes both ocean bottom deployed nodes 130 and towed nodes 120 is that the towed nodes 120 can be configured for capturing relatively shorter offset seismic data, while the ocean bottom nodes 130 can be configured for capturing relatively longer offset seismic data, thereby providing complementary data sets to improve the overall data quality.

In one embodiment, the seismic survey 100 may involve towing nodes 120 over an area in which one or more ocean bottom cables 122 have been deployed. Ocean bottom cables 122 can include non-autonomous sensor nodes 130 that are physically and/or electrically connected to a telemetry system provided in the cable 122, in order to facilitate transfer of power, data, and other communications. Alternatively, autonomous nodes 130 can be independently deployed on ocean bottom 118, or distributed along a passive cable or rope 122 comprising a flexible structural component adapted for deployment of autonomous nodes 130. In any of these embodiments, nodes 130 can include peer-to-peer communication interfaces (e.g., acoustic, capacitive or inductive), but do not necessarily require power or data communications along cable 122.

Examples

An exemplary marine seismic sensor system comprises a seismic node having at least one seismic sensor disposed in a hydrodynamic body adapted to modulate drag and flow noise in a water column. The sensor is configured for sampling seismic energy propagating in the water column, e.g., as produced by a seismic source for the purposes of a marine seismic survey.

A tether couples the hydrodynamic body to a cable or rope, which may subject the seismic node to acceleration when towed through the water column. The acceleration can include one or more different frequency components, depending on the towing speed, drag, and other factors.

At least one control surface can be provided on the hydrodynamic body, and configured for positioning the seismic node with respect to the rope or water column (or both), when the node is towed by or tethered to the rope. The tether can be adapted to modulate transmission of one or more of the frequency components of the acceleration, in order to reduce the amplitude of acceleration of the seismic node relative to that of the rope.

The hydrodynamic body may have different horizontal and vertical profiles configured to preferentially capture acoustic or seismic energy propagating in a vertical direction with respect to acoustic or seismic energy propagating in a horizontal direction. The body may also be configured to preferentially reduce capture of the acoustic or seismic energy propagating in the horizontal direction with respect to the vertical, in order to improve the signal to noise ratio of the seismic data sampled or acquired by the sensor. For example, either the body itself or the horizontal (wing) and vertical (fin) surfaces can be adjusted to provide relatively greater horizontal cross section or surface area and relatively less vertical cross section or surface area.

Depending on application, the control surface (or surfaces) can be configured to maintain spacing between the rope and the hydrodynamic body when towed through the water column. A navigational system can also be provided (e.g., with a wired or wireless transceiver), and configured to determine a position of the seismic node when towed through the water column. One or more actuators can then be configured to adjust the control surfaces to maintain one or both of the spacing between the rope and the hydrodynamic body, and the position of the seismic node when towed through the water column.

In any of these examples, an actuator can be provided to selectively adjust a length of the tether between the hydrodynamic body and the rope. Based on the adjustment, a natural frequency of vibration of the tether can be shifted with respect to the one or more frequency components of the acceleration.

The seismic sensor (or sensors) can be positioned within the seismic node, spaced within an outer surface of the node housing. One or more acoustic channels may also extend through the hydrodynamic body, providing an acoustic passage that runs from the seismic sensor inside the seismic node to the water column outside the seismic node housing.

The tension in the tether is typically less than the tension in the adjacent rope cable, based on the relatively small drag forces generated by one or more individual seismic nodes coupled to the cable by the tether. This compares to the relatively much higher tension possible in the rope, due to the drag generated by all the seismic nodes coupled to the rest of the cable, downstream of the individual tether attachment.

The tension in the tether can be oriented off axis with respect to the centerline of the hydrodynamic body, for example using a single-point or multi-point bridle attachment to the node housing. Alternatively, a passage can be included in the hydrodynamic body, and adapted to engage the rope extending axially through the seismic node. In these examples, the tether can configured to exert a substantially symmetric towing force oriented along the rope axis, as it extends along the passage through the hydrodynamic body.

The seismic nodes may include local (slave) clock and memory components for time stamping and storing the seismic data generated by the sensor, along with an internal power source and communication components for transmitting navigational and control data. The rope can thus be provided as a simple passive strength component, which is configured for towing the hydrodynamic body through the water column on the tether without the need for additional power or data communications between the rope and the seismic node.

Marine seismic apparatus embodiments include one or more seismic nodes distributed along a rope deployable in a water column. Each of the seismic nodes can include at least one seismic sensor disposed in a hydrodynamic body adapted to modulate drag and flow noise, with the sensor configured for sampling seismic energy propagating in water column. Alternatively, some of the nodes can include seismic sensors and others can include navigational, steering, and control elements.

One or more passive or active control surfaces can be configured for positioning each of the seismic nodes with respect to the water column, with one or more tether members coupling the respective hydrodynamic bodies to the rope. The rope subjects the towed seismic nodes to acceleration, and the tether members are adapted to modulate one or more of frequency components of the acceleration to reduce transmission of the acceleration from the rope to the seismic nodes along the tether members, and/or to reduce the magnitude of the acceleration of the seismic nodes relative to the adjacent rope sections to which they are tethered.

In some embodiments, the seismic nodes include an actuator configured to adjust a length of one or more of the tether members, as defined between the respective hydrodynamic body (or bodies) and the rope. A natural frequency of vibration of the tether members is thus shifted with respect to the one or more frequency components of the acceleration, based on the tether length, in order to reduce transmission of noise-inducing motion from the rope to the tethered nodes.

The rope can be formed of a passive strength component configured for towing the hydrodynamic bodies through the water column on the tether members, absent power or data lines for communication between the rope and the seismic nodes. A navigational system can be provided on one or more of the nodes, e.g., with a wireless transceiver, where the navigational system is configured to actuate the respective (active) control surfaces to maintain a position of the seismic nodes in the water column, when towed by the rope. Maintaining the position can include adjusting the depth and lateral position according to a predefine sail line or survey plan, and maintaining a spacing between the seismic nodes and the rope to further reduce noise effects by avoiding direct contact or other mechanical coupling, except along the tether.

A deployment system can be provided with a winch configured for deploying the rope into the water column, and a magazine configured for storing the seismic nodes. The seismic nodes are coupled to the rope at preselected positions, for deployment into the water column along the rope. In some embodiments, the deployment system includes an automated coupling mechanism adapted to couple the seismic nodes to the rope based on a database of predefined configurations, where each of the predefined configurations can determine different sets of preselected positions for the seismic nodes distributed along the rope.

Method embodiments include providing a plurality of seismic nodes, each of the seismic nodes having at least one seismic sensor disposed in a hydrodynamic body adapted to modulate drag and flow noise in a water column. The sensor is configured for sampling seismic energy that propagates through the water column, when the nodes are deployed.

Suitable deployment steps include coupling the seismic nodes to a rope via one or more tether members, and deploying the rope into the water column with the seismic nodes distributed along the rope. Suitable towing steps include towing the seismic nodes through the water column along the rope. The rope subjects the seismic nodes to acceleration having one or more frequency components, which can be modulated via the tether members to reduce transmission of the acceleration along the tether members, and/or to reduce the acceleration of the seismic nodes relative to that of the rope.

Additional method steps include adjusting a length of one or more tether members, as defined between the respective hydrodynamic body and the rope. As a result, one or more natural frequencies of vibration of the tether members can be shifted with respect to the frequency components of the acceleration, in order to reduce transmission of noise-inducing vibrations or accelerations from rope to the seismic nodes.

Control surfaces on one or more of the seismic nodes can be actuated to maintain or adjust one or more of spacing between the respective hydrodynamic bodies and the rope, and the positions of the respective seismic nodes with respect to the rope or water column. Control surfaces on one or more of the seismic nodes can also be actuated to maintain depth and position within the water column, when tethered to the rope towed by a seismic vessel.

While this invention is described with respect to particular examples and embodiments, it is understood that changes can be made and equivalents may be substituted to adapt the disclosure to different materials, problems and situations, while remaining within the spirit and scope of the invention as claimed. The invention is thus not limited to the particular features and examples that are disclosed, but encompasses all embodiments that fall within the scope of the appended claims. While the foregoing is directed to particular embodiments of the present invention, other and further embodiments may also be devised without departing from the scope of the invention, which is determined by the claims that follow.

What is claimed is:

1. A seismic apparatus comprising:
   a rope deployable in a water column and configured to be towed;
   one or more seismic nodes coupled to the rope, each of the seismic nodes comprising at least one seismic sensor configured for sampling seismic energy in the water column; and
   one or more tether members coupling the seismic nodes to the rope;
   wherein each of the seismic nodes is disposed in a hydrodynamic body providing horizontal and vertical profiles adapted to preferentially capture acoustic or seismic energy propagating in a vertical direction with respect to acoustic or seismic energy propagating in a horizontal direction.

2. The seismic apparatus of claim 1, wherein the one or more tether members comprise elastic material selected for modulating one or more frequency components of acceleration of the seismic nodes relative to the rope.

3. The seismic apparatus of claim 1, wherein the rope comprises a passive strength component configured for towing the one or more seismic nodes through the water column, absent power or data communications between the rope and the seismic nodes.

4. The seismic apparatus of claim 1, wherein the seismic nodes comprise one or more steering nodes each having a controller configured to actuate respective control surfaces for positioning the respective seismic nodes with respect to the water column, and one or more control nodes configured for communicating navigational data to the steering nodes via a wireless transceiver, wherein the navigational data determine the positioning of the respective seismic nodes when towed by the rope.

5. The seismic apparatus of claim 1, further comprising a deployment system having a winch configured for deploying the rope and a magazine configured for storing the seismic nodes, wherein the seismic nodes are coupled to the rope at selected positions for deployment into the water column.

6. The seismic apparatus of claim 5, further comprising an automated coupling mechanism adapted to couple the seismic nodes to the rope according to a database of predefined configurations determining deployment of the seismic nodes in different preselected positions along the rope.

7. The seismic apparatus of claim 1, further comprising a seismic source deployed in the water column, the seismic source configured to generate a seismic wavefield for sampling by the seismic nodes towed by the rope.

8. The seismic apparatus of claim 7, further comprising a plurality of ocean bottom nodes deployed below the water column, wherein the ocean bottom nodes are configured to sample the seismic wavefield at different offsets from the seismic nodes towed by the rope.

9. A seismic apparatus comprising:
   a rope deployable in a water column and configured to be towed;
   one or more seismic nodes coupled to the rope, each of the seismic nodes comprising at least one seismic sensor configured for sampling seismic energy in the water column;
   one or more tether members coupling the seismic nodes to the rope, wherein the one or more tether members comprise elastic material selected for modulating one or more frequency components of acceleration of the seismic nodes relative to the rope; and
   an actuator configured to adjust a length of one or more of the tether members, wherein a natural frequency thereof is shifted with respect to the one or more frequency components of the acceleration.

10. A method comprising:
    providing a plurality of seismic nodes, each of the seismic nodes having at least one seismic sensor configured for sampling seismic energy;
    coupling each of the seismic nodes to a rope;
    deploying the rope into a water column, with the seismic nodes distributed along the rope;
    towing the seismic nodes through the water column, wherein the seismic nodes are deployed along the rope; and
    sampling the seismic energy in the water column with the seismic nodes;
    wherein the seismic nodes are coupled to the rope via one or more tether members; and
    wherein the nodes have different horizontal and vertical profiles with relatively greater horizontal surface area, the nodes selectively capturing acoustic energy propagating in a vertical direction through the water column, with respect to a horizontal direction.

11. The method of claim 10, further comprising selecting a length of the one or more tether members to modulate transmission of at least one frequency component of acceleration of the rope.

12. The method of claim 10, further comprising actuating one or more control surfaces to maintain depth and lateral position of the one or more seismic nodes within the water column when towed by the rope.

13. The method of claim 10, further comprising sampling a seismic wavefield with the seismic nodes towed by the rope and with a plurality of ocean bottom nodes deployed below the water column, wherein the ocean bottom nodes sample the seismic wavefield at different offsets from the seismic nodes towed by the rope.

14. A seismic sensor system comprising:
a seismic node having at least one seismic sensor; and
a coupling between the seismic node and a rope, wherein the coupling comprises an elastic coupling member adapted to modulate transmission of one or more frequency components of acceleration of the rope to the seismic node;
wherein the at least one seismic sensor is configured for sampling seismic energy when the seismic node is towed by the rope;
wherein the seismic node comprises a hydrodynamic body with different horizontal and vertical profiles configured to preferentially capture acoustic energy propagating in a vertical direction through the water column with respect to acoustic energy propagating in a corresponding horizontal direction.

15. The seismic sensor system of claim 14, wherein the seismic node comprises an autonomous node having a power source, a clock and memory for storing the seismic data, wherein the rope comprises a passive strength component configured for towing the autonomous seismic node through the water column absent power or data line communication between the rope and the seismic node.

16. The seismic sensor system of claim 14, further comprising one or more active or passive control surfaces for positioning the seismic node when towed through the water column by the rope.

17. The seismic sensor system of claim 16, further comprising a navigational system configured to generate navigational data representative of the positioning of the seismic node by the control surfaces.

18. A seismic sensor system comprising:
a seismic node having at least one seismic sensor; and
a coupling between the seismic node and a rope, wherein the coupling comprises an elastic coupling member adapted to modulate transmission of one or more frequency components of acceleration of the rope to the seismic node;
wherein the at least one seismic sensor is configured for sampling seismic energy when the seismic node is towed by the rope; and
an actuator configured to selectively adjust a length of the elastic coupling member, wherein a natural frequency thereof is shifted with respect to the one or more frequency components to reduce transmission of the acceleration to the seismic node.

19. The seismic sensor system of claim 18, further comprising a controller configured to determine the selectively adjusted length of the elastic coupling member based on one or more of a tow speed of the rope through the water column and data generated by the sensor, wherein the data generated by the sensor characterize acceleration of the seismic node.

20. The seismic sensor system of claim 14, wherein the seismic sensor is spaced from the water column within the seismic node and further comprising one or more acoustic channels extending from the seismic sensor to the water column.

21. The seismic sensor system of claim 14, further comprising a passage in the seismic node adapted to engage the rope extending axially therethrough, wherein the coupling is configured to exert a net towing force oriented substantially along the rope extending through the passage.

* * * * *